(12) United States Patent
Rettenmyer et al.

(10) Patent No.: US 7,090,138 B2
(45) Date of Patent: Aug. 15, 2006

(54) SYSTEM AND METHOD FOR REDEEMING REWARDS AND INCENTIVES

(75) Inventors: Jessica Ann Rettenmyer, Alexandria, VA (US); Robert Jerome Greenberg, Glen Allen, VA (US); Chitra Jain, Glen Allen, VA (US)

(73) Assignee: Capital One Financial Corporation, McLean, VA (US)

( * ) Notice: Subject to any disclaimer, the term of this patent is extended or adjusted under 35 U.S.C. 154(b) by 0 days.

(21) Appl. No.: 10/740,707

(22) Filed: Dec. 18, 2003

(65) Prior Publication Data

US 2005/0133590 A1 Jun. 23, 2005

(51) Int. Cl.
*G06K 19/06* (2006.01)
(52) U.S. Cl. ..................... 235/493; 235/492
(58) Field of Classification Search ............. 235/493, 235/449, 380, 381, 383, 375, 382, 492
See application file for complete search history.

(56) References Cited

U.S. PATENT DOCUMENTS

| | | | |
|---|---|---|---|
| 2,616,612 A | 11/1952 | Guttman | |
| 3,505,954 A | 4/1970 | Projansky | |
| 3,583,317 A | 6/1971 | Gibson | |
| 3,637,994 A | 1/1972 | Ellingboe | |
| 3,876,864 A | 4/1975 | Clark et al. | |
| D264,853 S | 6/1982 | Scavino et al. | |
| 4,360,728 A | 11/1982 | Drexler | |
| D270,546 S | 9/1983 | Malmberg | |
| 4,443,027 A | 4/1984 | McNeely et al. | |
| 4,507,550 A | 3/1985 | Fleer | |
| D280,214 S | 8/1985 | Opel | |
| 4,562,342 A | 12/1985 | Solo | |
| 4,609,812 A | 9/1986 | Drexler | |
| 4,620,727 A | 11/1986 | Stockburger et al. | |
| 4,634,848 A | 1/1987 | Shinohara et al. | |
| 4,645,916 A | 2/1987 | Raisleger | |
| 4,656,346 A | 4/1987 | Drexler | |
| 4,659,914 A | 4/1987 | Kondo et al. | |
| D290,136 S | 6/1987 | Ball et al. | |
| 4,683,371 A | 7/1987 | Drexler | |
| 4,752,676 A | 6/1988 | Leonard et al. | |
| 4,806,740 A | 2/1989 | Gold et al. | |
| 4,855,583 A | 8/1989 | Fraser et al. | |
| D305,887 S | 2/1990 | Nishimura | |
| D310,386 S | 9/1990 | Michels et al. | |
| 5,128,524 A | 7/1992 | Anglin et al. | |
| 5,171,039 A | 12/1992 | Dusek | |

(Continued)

FOREIGN PATENT DOCUMENTS

CA   2303827 A1   9/2001

(Continued)

OTHER PUBLICATIONS

"Dual Stripe Magnetic Card", IBM Technical Disclosure Bulletin, p. 5928, May 1980.

(Continued)

*Primary Examiner*—Thien M. Le
(74) *Attorney, Agent, or Firm*—Baker & McKenzie LLP

(57) ABSTRACT

Transaction card comprising a substrate having a front face and a back face, a first magnetic stripe for storing data associated with a credit account, the first magnetic stripe being located along an edge of the back face, a second magnetic stripe for storing data associated with a rewards account, the second magnetic stripe being located along another edge of the back face, and account information located on the front face, the account information being associated with the credit account and the rewards account.

43 Claims, 7 Drawing Sheets

U.S. PATENT DOCUMENTS

| | | |
|---|---|---|
| 5,308,121 A | 5/1994 | Gunn |
| 5,326,964 A | 7/1994 | Risser |
| 5,386,458 A * | 1/1995 | Nair et al. ............... 379/91.01 |
| D358,419 S | 5/1995 | Runyan |
| D359,305 S | 6/1995 | Finkelstein |
| 5,424,523 A | 6/1995 | Ohno et al. |
| 5,440,108 A | 8/1995 | Tran et al. |
| D367,273 S | 2/1996 | Ebe |
| 5,550,709 A | 8/1996 | Iwasaki |
| 5,559,885 A | 9/1996 | Drexler et al. |
| D374,870 S | 10/1996 | Gaumet |
| D375,303 S | 11/1996 | Gaumet |
| D379,006 S | 4/1997 | Gaumet |
| D387,802 S | 12/1997 | Finkelstein et al. |
| 5,700,037 A | 12/1997 | Keller |
| 5,760,381 A | 6/1998 | Stich et al. |
| 5,818,030 A | 10/1998 | Reyes |
| 5,844,230 A | 12/1998 | Lalonde |
| D406,861 S | 3/1999 | Leedy |
| 5,883,377 A | 3/1999 | Chapin, Jr. |
| 5,918,909 A | 7/1999 | Fiala et al. |
| 5,975,302 A | 11/1999 | Young |
| 5,984,191 A | 11/1999 | Chapin, Jr. |
| D427,167 S | 6/2000 | Iwasaki |
| 6,107,221 A | 8/2000 | Nakajima et al. |
| 6,138,917 A | 10/2000 | Chapin, Jr. |
| D434,041 S | 11/2000 | Burke |
| D436,620 S | 1/2001 | Webb et al. |
| D436,991 S | 1/2001 | Morgante |
| D437,882 S | 2/2001 | Creighton |
| D438,562 S | 3/2001 | Webb et al. |
| D438,563 S | 3/2001 | Webb et al. |
| 6,222,914 B1 | 4/2001 | McMullin |
| D442,222 S | 5/2001 | Webb et al. |
| D442,627 S | 5/2001 | Webb et al. |
| D442,628 S | 5/2001 | Webb et al. |
| D442,629 S | 5/2001 | Webb et al. |
| D443,298 S | 6/2001 | Webb et al. |
| D447,515 S | 9/2001 | Faenza et al. |
| 6,290,137 B1 | 9/2001 | Kiekhaefer |
| D449,336 S | 10/2001 | Webb et al. |
| 6,296,188 B1 | 10/2001 | Kiekhaefer |
| 6,315,206 B1 | 11/2001 | Hansen |
| D453,160 S | 1/2002 | Pentz et al. |
| D453,161 S | 1/2002 | Pentz |
| D453,336 S | 2/2002 | Pentz et al. |
| D453,338 S | 2/2002 | Pentz et al. |
| D453,339 S | 2/2002 | Pentz |
| D453,516 S | 2/2002 | Pentz |
| D453,517 S | 2/2002 | Pentz |
| D454,910 S | 3/2002 | Smith et al. |
| D456,814 S | 5/2002 | Pentz |
| D457,556 S | 5/2002 | Hochschild |
| 6,386,591 B1 | 5/2002 | Blank |
| 6,402,029 B1 | 6/2002 | Gangi |
| 6,402,039 B1 | 6/2002 | Freeman et al. |
| D460,455 S | 7/2002 | Pentz |
| D461,477 S | 8/2002 | Nawrozki |
| 6,439,613 B1 | 8/2002 | Klure |
| D462,965 S | 9/2002 | Pentz |
| D462,966 S | 9/2002 | Pentz et al. |
| D464,355 S | 10/2002 | Burke |
| 6,471,127 B1 | 10/2002 | Pentz et al. |
| 6,484,940 B1 | 11/2002 | Dilday et al. |
| D467,247 S | 12/2002 | Pentz |
| D468,313 S | 1/2003 | Burke |
| D469,777 S | 2/2003 | Burke |
| 6,543,809 B1 | 4/2003 | Kistner et al. |
| 6,561,432 B1 | 5/2003 | Vedder et al. |
| 6,588,658 B1 | 7/2003 | Blank |
| 6,594,640 B1 | 7/2003 | Postrel |
| 6,601,769 B1 | 8/2003 | Barnhill |
| 6,631,849 B1 | 10/2003 | Blossom |
| 6,693,544 B1 | 2/2004 | Hebbecker |
| 6,698,116 B1 | 3/2004 | Waldron |
| 6,834,809 B1 | 12/2004 | Ogushi |
| 2001/0016825 A1 * | 8/2001 | Pugliese et al. ............... 705/5 |
| 2001/0034720 A1 | 10/2001 | Armes |
| 2001/0054003 A1 | 12/2001 | Chien et al. |
| 2002/0139849 A1 | 10/2002 | Gangi |
| 2002/0152116 A1 | 10/2002 | Yan et al. |
| 2002/0198779 A1 | 12/2002 | Rowen et al. |
| 2003/0024995 A1 | 2/2003 | Conner et al. |
| 2003/0069846 A1 | 4/2003 | Marcon |
| 2003/0075609 A1 | 4/2003 | Kim |
| 2003/0083933 A1 | 5/2003 | McAlear |
| 2003/0111527 A1 | 6/2003 | Blossom |
| 2003/0209608 A1 | 11/2003 | Blossom |
| 2004/0010462 A1 * | 1/2004 | Moon et al. ............... 705/39 |
| 2004/0011877 A1 | 1/2004 | Reppermund |
| 2004/0026915 A1 | 2/2004 | Thompson et al. |
| 2004/0118930 A1 * | 6/2004 | Berardi et al. ............... 235/492 |
| 2004/0210448 A1 | 10/2004 | Breck |
| 2004/0210449 A1 | 10/2004 | Breck |
| 2004/0230483 A1 * | 11/2004 | Kepecs ............... 705/14 |
| 2005/0017081 A1 | 1/2005 | Kondo et al. |

FOREIGN PATENT DOCUMENTS

| | | |
|---|---|---|
| GB | 1354978 A | 6/1974 |
| GB | 2105080 A | 3/1983 |
| JP | 58161077 A | 9/1983 |
| JP | 59148931 A | 8/1984 |
| JP | 59148932 A | 8/1984 |
| JP | 63304425 | 12/1988 |
| JP | 2121117 | 5/1990 |
| JP | 5205115 | 8/1993 |
| JP | 2001101363 | 4/2001 |
| JP | 2002024782 | 1/2002 |

OTHER PUBLICATIONS

Ellen Leander, "Collegian: captive audience for smart cards?", American Banker, Tuesday, Sep. 12, 1995, Copyright 2003 Gale Group.

Discover 2Go Card; http://www.discover2go.com; 5 pages; Jan. 15, 2003.

Legon, Jeordan; "Companies aim to make paying faster, easier"; http://www.cnn.com/2002/TECH/ptech/11/26/mini.credit; Jan. 15, 2003.

USA: Bank of America is launching a mini bank card; http://www.qualisteam.c.om/news; Jan. 15, 2003.

Mini Card; http://www.bankofamerica.com/creditcards/index.cfm?template=cc_features_minicard&adlin; Jan. 15, 2003.

Multimedia Available: Mini Credit Card on KeyChain; http://money.cnn.com/services/tickerheadlines/bw/223380293.htm; Jan. 15, 2003.

* cited by examiner

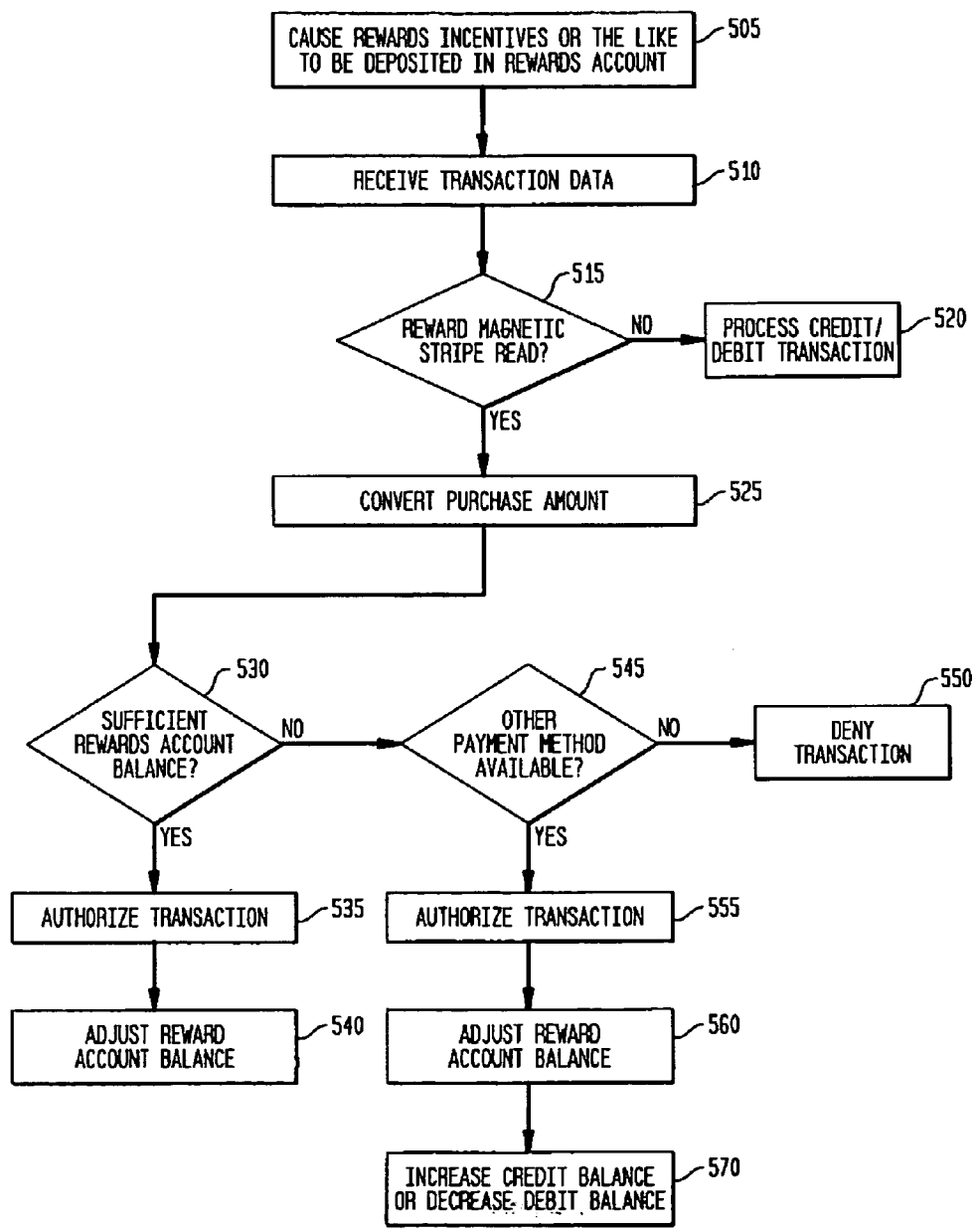

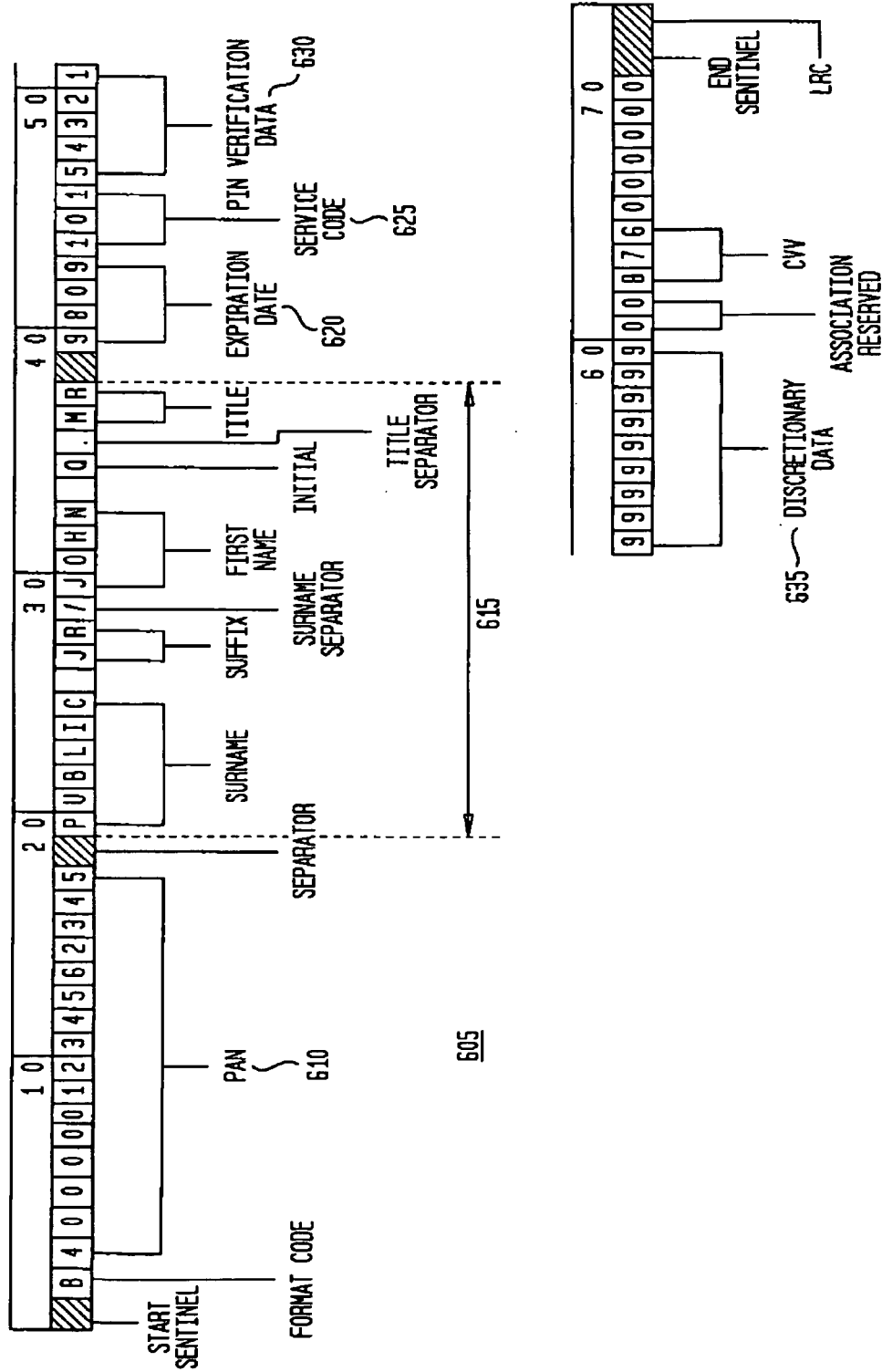

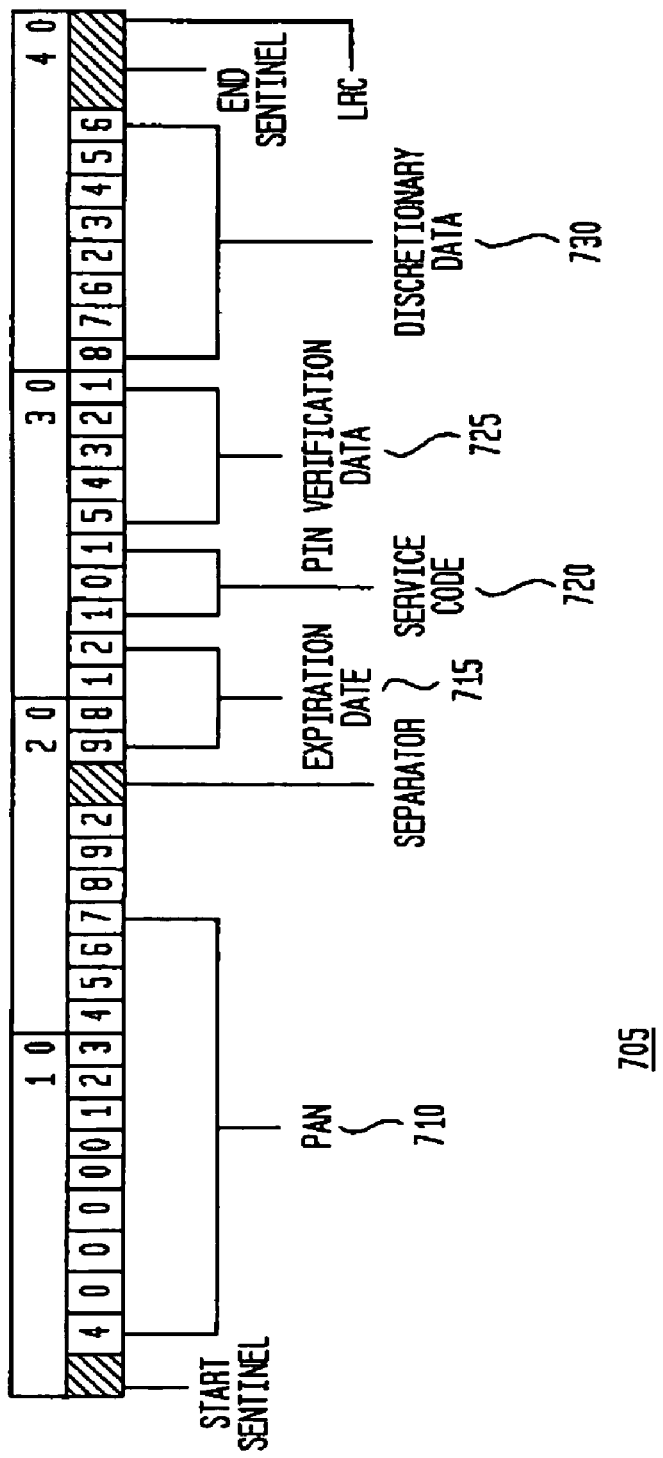

SYSTEM AND METHOD FOR REDEEMING REWARDS AND INCENTIVES

FIELD

The present application relates to a system and method for redeeming rewards and incentives and, more particularly, to a system and method for redeeming rewards and incentives using a transaction card having at least two magnetic stripes.

BACKGROUND

Numerous financial institutions, such as credit card companies and banks, and other entities, such as airline carriers, hotels and retailers, offer membership reward programs. These programs often reward participants with fictitious reward units, such as points or the like, when purchasing merchandise or services from merchants using a qualified account, such as a debit or credit account. A participant may use a transaction card associated with the qualified account to conduct the respective transaction. Reward units typically accrue at a rate of one unit for every dollar spent using the credit or debit account and the accrued units operate as currency. Some entities restrict purchasing to particular merchants to earn reward units, whereas other financial institutions have no such restrictions. The maximum reward units a participant can earn annually are usually unlimited. Additionally, reward units usually do not accumulate on cash advances, convenience checks, balance transfers, fees or adjustments. When merchandise purchased with the respective account is returned, the account credit will result in a reduction of reward units.

Participants usually seek to accumulate enough reward units to purchase merchandise or services. For instance, a participant may seek to accumulate enough reward units to purchase a particular product from an associated merchant or purchase an airline ticket from another associated merchant. Depending on the program, only certain merchants are considered qualified merchants with whom reward units can be redeemed towards a purchase.

Membership reward programs also often offer participants other rewards, incentives or the like instead of or in addition to the ability to accumulate reward units. For example, some membership reward programs return to a participant a predetermined percentage of a transaction amount or of an amount spent during a predetermined period (referred to as "cash back") either as a credit to an account or by check, offer participants discounts on select merchandise or services, and complimentary merchandise or services.

As described above, a transaction card having a magnetic stripe associated with a debit or credit account can be used by a participant to conduct a transaction and hence earn reward units and/or other rewards, incentives or the like, assuming the participant is entitled to such rewards, incentives or the like, for instance, if the participant is enrolled in a membership reward program. The accumulated rewards, incentives or the like cannot be redeemed with the transaction card, as the transaction card only has one magnetic stripe associated with a credit or debit account. Instead, other known methods for redemption are utilized by participants.

Transaction cards having more than one magnetic stripe are known in the art. However, the magnetic stripes are operable, for example, for access to separate debit accounts having funds deposited therein and accounts having credit lines associated therewith and are operable, for example, to separate transactions at the point-of-sale, such as business expenses and personal expenses.

A need, however, exists for a system and method that enables a cardholder to accumulate rewards, incentives or the like and to redeem at least a portion of those rewards, incentives or the like using a particular dedicated magnetic stripe located on a transaction card having at least one other magnetic stripe.

SUMMARY

An aspect of the present application provides for a transaction card, comprising a substrate having a front face and a back face, a first magnetic stripe for storing data associated with a credit account, the first magnetic stripe being located along an edge of the back face, a second magnetic stripe for storing data associated with a rewards account, the second magnetic stripe being located along another edge of the back face, and account information located on the front face, the account information being associated with the credit account and the rewards account.

Another aspect of the present application provides for a transaction card, comprising a substrate having a front face and a back face, a first magnetic stripe for storing data associated with a credit account, the first magnetic stripe being located along an edge of the back face, and a second magnetic stripe for storing data associated with a rewards account, the second magnetic stripe being located along another edge of the back face, the second magnetic stripe including a plurality of data fields, data stored or no data being stored in at least one of the plurality of data fields identifying the second magnetic stripe as being associated with the rewards account, wherein account information is located on the front face, the account information being associated with the credit account and the rewards account, and the rewards account has a balance equal to a number of accumulated reward units, the reward units operable as currency with at least one of a plurality of merchants suing the second magnetic stripe.

A further aspect of the present application provides for a transaction card, comprising a substrate having a front face and a back face, a first magnetic stripe for storing data associated with a credit account, the first magnetic stripe being located along an edge of the back face, a second magnetic stripe for storing data associated with a rewards account, the second magnetic stripe being located along another edge of the back face, first account information located on the front face, the first account information being associated with the credit account, and second account information located on the front face, the second account information being associated with the rewards account.

A still further aspect of the present application provides for a method for processing a transaction initiated with a merchant using a transaction card having at least two magnetic stripes, the method comprising receiving data associated with the transaction, the data including a purchase amount, determining according to the received data whether a first magnetic stripe or a second magnetic stripe was read at the merchant, the second magnetic stripe being associated with a rewards account, converting the purchase amount to an amount of reward units, if it is determined that the second magnetic stripe was read at the merchant, and determining whether the rewards account has a balance of reward units at least equal to the amount of converted reward units.

BRIEF DESCRIPTION OF THE DRAWINGS

FIG. 5 illustrates an exemplary flow diagram for accumulating and redeeming rewards, incentives or the like according to the exemplary embodiments of the present application;

FIG. 6 illustrates exemplary data fields associated with track 1 of a magnetic stripe; and FIG. 7 illustrates exemplary data fields associated with track 2 of the magnetic stripe.

DETAILED DESCRIPTION

Figure 1:
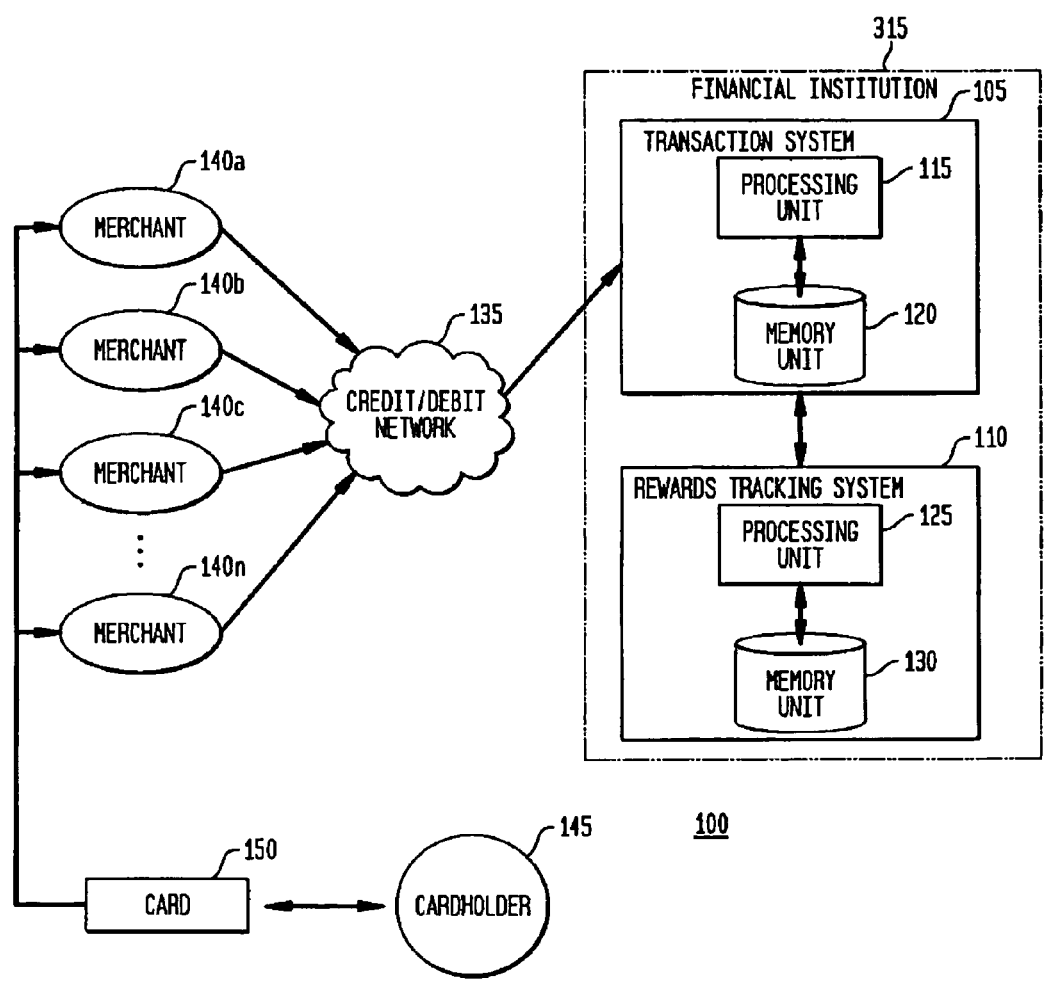
FIG. 1 illustrates an exemplary reward accumulation and redemption system according to the exemplary embodiments of the present application.
Figure 2:
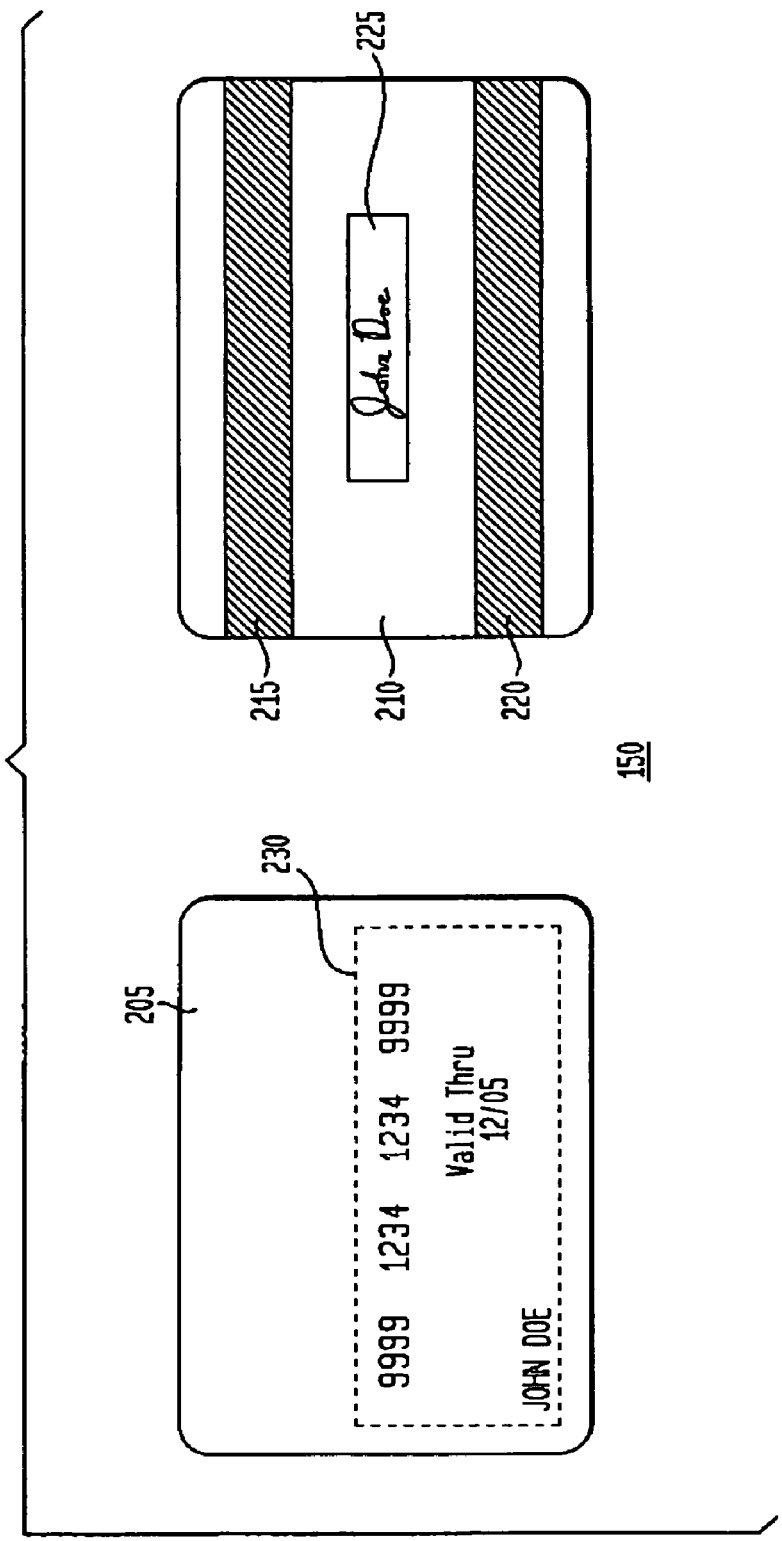
FIG. 2 illustrates an exemplary transaction card used with the exemplary system shown in FIG. 1.

FIG. 1 depicts an exemplary reward accumulation and redemption system 100. Reward accumulation and redemption system 100 enables a participant in a reward program (hereinafter referred to as "cardholder 145") to earn rewards, incentives or the like, for instance, by engaging in transactions with merchants using a transaction card associated with a qualified financial account, and later redeeming those accumulated rewards, incentives or the like using the same transaction card with those merchants or with other merchants. An exemplary transaction card of the present application, transaction card 150, includes at least two magnetic stripes, as illustrated in FIGS. 2, 3 and 4 and described herein.

Figure 3:
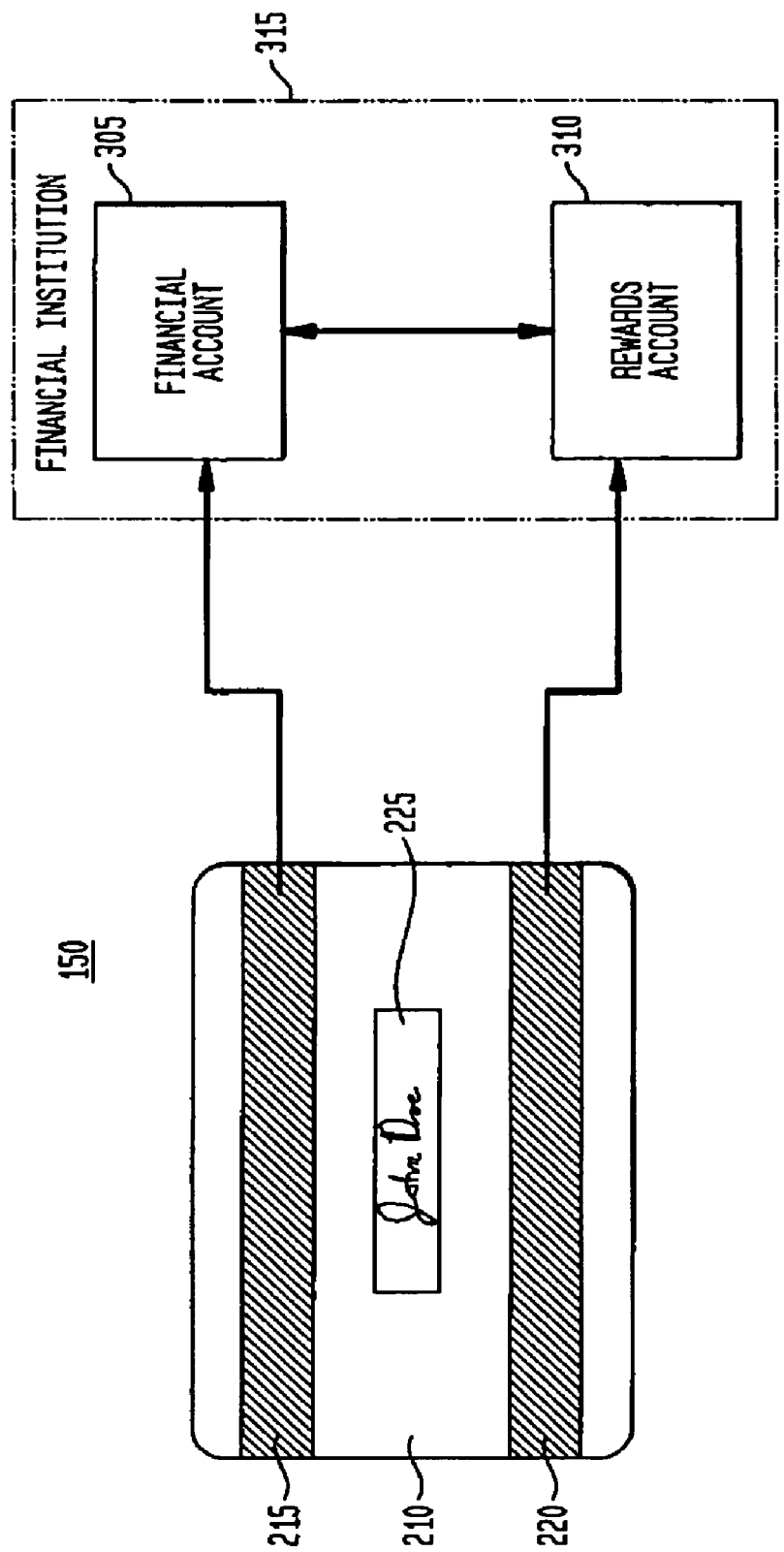
FIG. 3 illustrates the exemplary transaction card shown in FIG. 2 and exemplary accounts associated with respective magnetic stripes.
Figure 4:
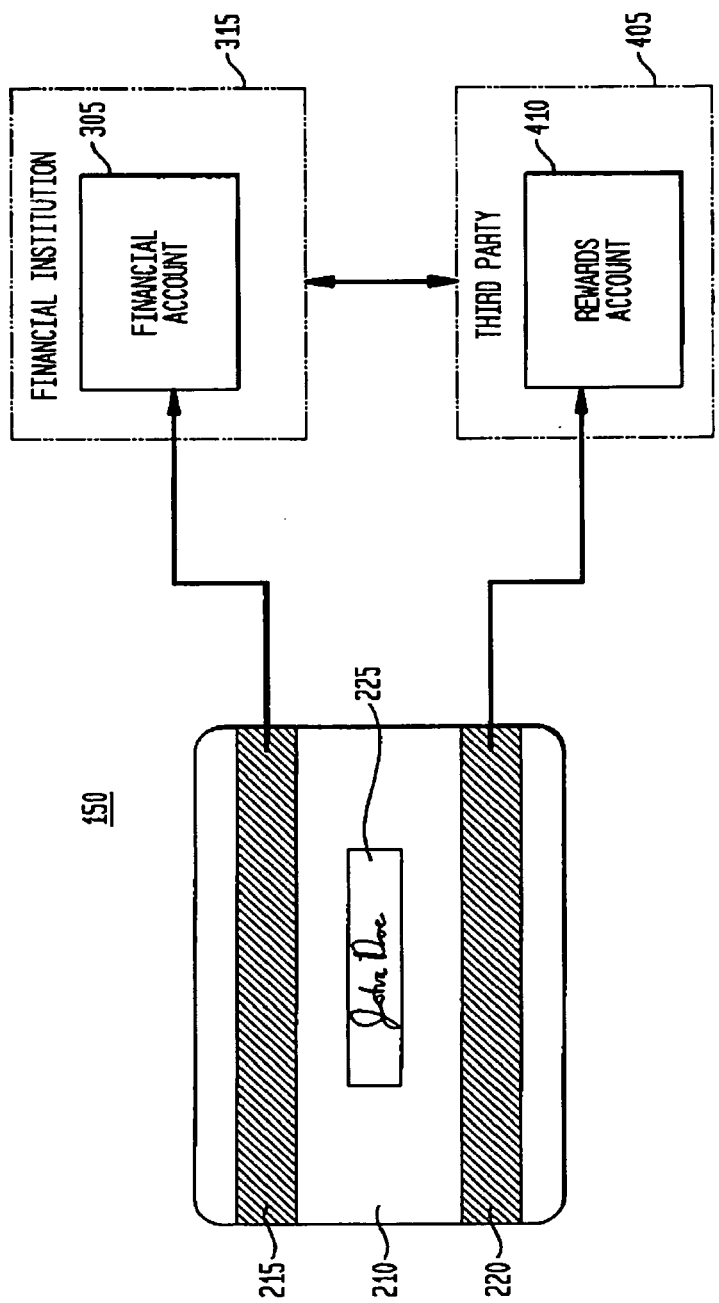
FIG. 4 illustrates the exemplary transaction card shown in FIG. 2 and exemplary accounts associated with respective magnetic stripes.

In an exemplary embodiment of the present application, cardholder 145 has the ability to earn a plurality of reward units, such as points, for example, for purchases with merchants 140a . . . 140n using qualified financial account 305, such as a credit or debit account, shown in FIGS. 3 and 4, as described herein.

The present application is applicable, to any institution or company having a membership reward program associated therewith, including financial institutions, airlines, supermarkets, hotels, car rental companies, retail stores, Internet loyalty programs, loyalty providers, such as Carlson Companies, Inc. and Cendant Corporation, and Visa® and MasterCard® that offer rewards, incentives or the like. In an exemplary embodiment of the present application, the membership reward program is managed directly by the institution or company, for instance, financial institution 315, as seen in FIG. 3. Alternatively, the membership reward program is managed by a third party, for instance, third party 405 associated with financial institution 315, as depicted in FIG. 4. Financial institution 315 may or may not in a partnership with third party 405 and/or other party. For instance, in the event financial institution 315 has a partnership relationship with third party 405 and/or other party, the relationship may involve a co-branding.

The membership reward program can also be operable as an independent reward program, as an accelerator reward program, as a coalition reward program or otherwise, or as a combination thereof. As would be appreciated by a person having ordinary skill in the art, when enrolled in an accelerator program, a participant accelerates the earning of reward units or the like in another reward program independent of the accelerator program, for example, when conducting transactions with an account linked to the accelerator program. A coalition reward program, such as Upromise (www.upromise.com), is operable for participants to earn rewards from a particular suite of merchants. Other reward programs can be associated with the coalition reward program. When a participant conducts a transaction with one of the merchants within the suite using one of these other reward programs, that participant earns additional rewards. For instance, a reward program associated with a coalition reward program is operable for participants to earn X % for every transaction regardless of the merchant and an additional Y % for transactions conducted with one of the merchants within the suite and an additional Z % at another one of the merchants within the suite.

Accordingly, two or more membership reward programs can be linked together so that a participant earns reward units or the like in a single rewards account 310, 410 from various sources.

Reward system 100 includes exemplary transaction system 105 and exemplary rewards tracking system 110. Transaction system 105 is linked to a plurality of merchants 140a . . . 140n via credit/debit network 135. Transaction system 105 includes processing unit 115 and memory unit 120 coupled to processing unit 115, processing unit 115 managing and recording data associated with transactions between cardholder 145 and merchants 140a . . . 140n. Memory unit 120 is operable for storing personal information pertaining to each participant, including cardholder 145, and account data pertaining to the respective participants, for example, account number(s) and transaction data. Memory unit 120 can include various types of memory storage devices, for example, one or more databases, relational or otherwise and, therefore, is not meant to be limited to any particular type of storage device.

Rewards tracking system 110 is linked to transaction system 105 and includes processing unit 125 coupled to memory unit 130. Rewards tracking system 110 can either be associated with the reward program offered, for example, by financial institution 315, associated with a third party, such as third party 405, having reward managing responsibilities for reward accumulation and/or reward redemption, or responsibilities can be shared between the respective parties. Processing unit 125 is operable for managing reward accrual and redemption, and memory unit 130 is operable for storing data regarding reward accrual and reward redemption for each respective participant including cardholder 145. Memory unit 130 can include various types of memory storage devices, for example, one or more databases, relational or otherwise and, therefore, is not meant to be limited to any particular type of storage device.

In an exemplary embodiment, memory unit 130 and memory unit 120 are relational databases so that data can be stored in both memory units 130, 120 for cardholder 145. Alternatively, either memory unit 130 or memory unit 120 is included in reward system 100 and can be included in rewards tracking system 110, transaction system 105, or elsewhere. Similarly, either processing unit 115 or processing unit 125 can be included in reward system 100 and can be included in rewards tracking system 110, transaction system 105, or elsewhere. The functionality provided by reward tracking system 110 and transaction system 105 can also be provided by a single system, as opposed to separate systems linked together, such as rewards tracking system 110 and transaction system 105.

Transactions and prospective transactions between cardholder 145 and merchants 140a . . . 140n are processed by processing unit 115 via credit/debit network 135. For instance, credit/debit network 135 could be the MasterCard®/Visa® network or other proprietary networks, such as Plus, Novus (debit), Diner's Club® (credit) and American Express®, the operation and use of which are well known in the art and are, thus, not described herein. Transactions between cardholder 145 and merchants 140a . . . 140n can be initiated at a point-of-sale ("POS") terminal, through an Internet link, through a mail link or through a telephone link.

In an exemplary embodiment, cardholder 145 purchases with qualified financial account 305 merchandise and services from or through any of the plurality of merchants 140a . . . 140n and earns rewards, incentives or the like, such as reward units, on those purchases since financial account 305 is associated with the reward program. The accumulated rewards, incentives or the like are reflected in rewards account 310, 410. Cardholder 145, however, can only use those earned reward units with those merchants, referred to hereinafter as qualified merchants, amongst merchants 140a . . . 140n that have a preexisting business arrangement with the reward program associated with financial account 305. Cardholder 145 is not restricted as to which of the plurality of merchants 140a . . . 140n, qualified or non-qualified, they can make purchases from or through.

Furthermore, depending on the reward program, cardholder 145 may be able to redeem reward units for gift certificates, cash or the like and, therefore, have the ability to make purchases from any merchant amongst the plurality of merchants 140a . . . 140n, assuming the respective merchant accepts such gift certificates, cash or the like. As will be appreciated by a person having ordinary skill in the art, the present application is not limited to redemption within credit/debit network 135.

Alternatively, cardholder 145 can use those earned reward units or other rewards, incentives or the like, with any one of the merchants 140a . . . 140n regardless of whether the respective merchant has a preexisting business arrangement with the reward program associated with financial account 305. Hence, the respective merchant processes the transaction using, for instance, the earned reward units as currency without being aware that a form of payment was used other than a cash reserve or a credit line.

The exemplary embodiments of the present application are described herein with reference to reward units as being points, and earning and redeeming the same. The present application, however, is not limited to points, as points are units merely symbolizing a form of currency for use towards transactions. Hence, other symbols operable as currency are equally applicable to the exemplary embodiments of the present application, for instance, miles, stars, dollars, cash, rebates or credits.

Further, the exemplary embodiments of the present application are described herein with reference to participants such as cardholder 145. Participants are individuals that have enrolled, for instance, in the membership reward program and therefore are entitled to earn and redeem points. Even though the exemplary embodiments are described herein with reference to such participants having membership in a reward program, alternatively, membership in a particular program is not a prerequisite for earning and redeeming rewards, incentives or the like.

The components of FIG. 1 may be implemented through hardware, software, and/or firmware. The components in reward system 100 are not limited to those illustrated.

Exemplary transaction card 150 is depicted in more detail in FIG. 2. Transaction card 150 includes front face 205 and back face 210. Transaction card 150 is a conventional transaction card except transaction card 150 includes conventional magnetic stripe 215 and an additional magnetic stripe—reward magnetic stripe 220 on back face 210. Reward magnetic stripe 220 is located along the bottom, horizontal side edge of transaction card 150, as can be seen in FIG. 2. Alternatively, the location of conventional magnetic stripe 215 and reward magnetic stripe 220 can be reversed from what is illustrated in FIG. 2.

As will be appreciated by a person having ordinary skill in the art, conventional magnetic stripe 215 and reward magnetic stripe 220 each include at least one track having a plurality of data fields. FIGS. 6 and 7 illustrate two tracks associated with each magnetic stripe. Specifically, FIG. 6 illustrates exemplary data fields associated with track 1 605 of conventional magnetic stripe 215 and reward magnetic stripe 220 and FIG. 7 illustrates exemplary data fields associated with track 2 705 of conventional magnetic stripe 215 and reward magnetic stripe 220, track 1 605 and track 2 705 having exemplary data encoded thereon for illustration purposes. Alternatively, conventional magnetic stripe 215 and/or reward magnetic stripe 220 can have one track or can have more than two tracks. As will also be appreciated by a person having ordinary skill in the art, a magnetic stripe often has multiple tracks encoded with the same or similar data because different devices, such as POS terminals, automated teller machines or the like, may read different tracks. One of the multiple tracks may also be left empty—not encoded with any data. The exemplary embodiments of the present application, however, are equally applicable to a magnetic stripe having one track.

The data fields of track 1 605 are encoded with data indicating, for instance, account number 610, card holder's name 615, expiration date 620, service code 625 and PIN verification (optional) 630, as depicted in FIG. 6. Track 1 605 also includes a discretionary data field 635, an operation of which is described herein. The data fields of track 2 705 are encoded with data indicating, for instance, account number 710, expiration date 715, service code 720 and PIN verification (optional) 725, as illustrated in FIG. 7. Track 2 705 also includes a discretionary data field 730, an operation of which is described herein. The present application is not limited to the data fields shown in FIGS. 6 and 7. For instance, additional data fields can be included, the size of a respective data field can be different and the ordering of the data fields in a respective track can be different.

Transaction card 150 also includes indicia 230 on front face 205, indicia 230 being, for example, an account number, an expiration date and the name of cardholder 145. Besides conventional magnetic stripe 215 and reward magnetic stripe 220, back face 210 includes signature box 225. Front face 205 and rear face 210 can include various other information in addition to or in place of indicia 230 and signature box 225. In an alternative embodiment of the present application, front face 205 includes another set of indicia such that indicia 230 corresponds to financial account 305 and the other set of indicia corresponds to rewards account 310,410, or vice versa.

FIG. 3 illustrates exemplary accounts accessible when using conventional magnetic stripe 215 and reward magnetic stripe 220. For instance, conventional magnetic stripe 215 is operable for accessing financial account 305 managed by financial institution 315. As described herein, financial account 305 can be a credit account, a debit account such as a checking account, savings account, a money market account or the like, a college fund account, a stored value account, or the like. Reward magnetic stripe 220 is operable for accessing rewards account 310 also managed by financial institution 315. In an exemplary embodiment, rewards account 310 has a balance equal to a number of accumulated reward units, for example, points.

Alternatively, reward magnetic stripe 220 can be operable for accessing rewards account 410 managed by third party 405, as shown in FIG. 4. Third party 405 is linked to financial institution 315. As a result, data regarding the membership reward program managed by third party 405 is accessible to financial institution 315 so that financial institution 315 can accept or decline attempted transactions by cardholder 145, as described herein or third party 405 can accept or decline attempted transactions and transmit data indicating such a determination to financial institution 315.

FIG. 5 illustrates an exemplary flow chart for accumulating and redeeming rewards, incentives or the like according to the exemplary embodiments of the present application. As points are accumulated by cardholder 145, the respective points are thereafter deposited in rewards account 310 (and/or rewards account 410), in 505. That is, the balance of rewards account 310 is increased according to a value attributed to the accumulated points. Points can be earned based on purchases with or without using transaction card 150, promotions, bonuses, incentives, points savings such as interest on points, redemption behavior or the like.

Transaction card 150 is presented by cardholder 145 to one of the plurality of merchants 140a . . . 140n, for instance, at a POS terminal. The POS terminal or other device, alone or in combination with one or more additional devices, reads data stored in the plurality of data fields of either conventional magnetic stripe 215 or reward magnetic stripe 220 depending on which magnetic stripe was read. Each time transaction card 150 is read at one of the plurality of merchants 140a . . . 140n, the respective one of the plurality of merchants 140a . . . 140n transmits transaction data to processing unit 115 and processing unit 115 in turn receives the respective transaction data which includes at least a portion of the data read from the plurality of data fields via credit/debit network 135, in 510. Based on an evaluation of the received transaction data, processing unit 115 determines whether reward magnetic stripe 220 or conventional magnetic stripe 215 was read at merchant 140a . . . 140n, in 515.

In an exemplary embodiment, processing unit 115 determines whether reward magnetic stripe 220 or conventional magnetic stripe 215 was read at merchants 140a . . . 140n by examining data stored in at least one predetermined data field of the respective magnetic stripe, for example, discretionary data stored in discretionary data fields 635, 730 shown in FIGS. 6 and 7, respectively. For instance, the predetermined data field(s) of the reward magnetic stripe 220 includes data, whereas the corresponding data field of the conventional magnetic stripe 215 does not contain any data. Hence, processing unit 115 determines that reward magnetic stripe 220 was read by the presence of data in the at least one predetermined data field. Alternatively, the predetermined data field(s) of the conventional magnetic stripe 215 and the corresponding data field(s) of the reward magnetic stripe 220 contain different data. As a result, processing unit 115 determines whether reward magnetic stripe 220 or conventional magnetic stripe 215 was read at merchants 140a . . . 140n by examining the content of the respective data fields.

In an exemplary embodiment, the same data is encoded in track 1 605 and track 2 705 of reward magnetic stripe 220 since different POS terminals or other devices may read different tracks of reward magnetic stripe 705. Some POS terminals or other devices may even read both tracks. Alternatively, track 1 605 and track 2 705 are not encoded with any data.

As will be appreciated by a person having ordinary skill in the art, the present application is not limited to the above-described manners of determining which magnetic stripe was read at one of the plurality of merchants 140a . . . 140n. Other manners can be used instead of or in addition to the manners described herein that are within the scope of the present application. In an exemplary embodiment, data is stored in the predetermined data field(s) at the time one or more of the other data fields is coded with data, such as account data.

If processing unit 115 determines that conventional magnetic stripe 215 was read at merchant 140a . . . 140n, then at least a portion of the transaction data indicating the account number is used by processing unit 115 to process the transaction initiated by cardholder 145 in a conventional manner for processing credit or debit transactions which are well known to a person having ordinary skill in the art, in 520. Further, in an exemplary embodiment, assuming the transaction is authorized, at least a portion of the received transaction data is transmitted to rewards tracking system 110 so that the respective amount of reward units (points) earned based on the amount of the transaction is deposited in rewards account 310, 410.

If processing unit 115 determines, however, that reward magnetic stripe 220 was read at merchant 140a . . . 140n, then at least a portion of the received transaction data and/or other data is transmitted to processing unit 125 of rewards tracking system 110, that data indicating at least the monetary value of the attempted transaction by cardholder 145, referred to hereinafter as the purchase amount data. In an exemplary embodiment, processing unit 125 of rewards tracking system 110 converts the purchase amount data into at least a portion of a reward unit (point) using a predetermined computation, for instance, every dollar equals X reward unit(s), in 525.

Next, processing unit 125 retrieves data stored in memory unit 130 indicating the balance of rewards account 310, 410. Processing unit 125 then determines whether the balance of rewards account 310, 410 is equal to or greater than the amount of pointa representing the converted purchase amount, in 530. If it is determined that the balance is equal to or greater than the converted purchase amount, then processing unit 125 transmits data to processing unit 115 indicating transaction authorization and processing unit 115 in turn transmits data indicating transaction authorization to the respective one of the plurality of merchants 140a . . . 140n, in 535. Processing unit 115 and/or processing unit 125 then adjusts the balance of reward account 310, 410 to reflect the converted converted amount which data is stored in memory unit 130, in 540. For example, the balance of reward account 310, 410 is decreased by an amount equal to the amount of points representing the purchase amount.

If processing unit 125 determines that the balance of reward account 310, 410 is less than the converted purchase amount, then processing unit 125 and/or processing unit 115 determines whether at least one other payment method is available to cover at least a portion of the transaction amount, for instance, whether cardholder 145 has an associated credit account and/or an associated debit account that has a sufficient credit line and/or cash, respectively, in 545. In an exemplary embodiment, the associated credit account and/or the associated debit account is financial account 305. As will be appreciated by a person having ordinary skill in the art, data regarding accounts other than or in addition to financial account 305 can be retrieved and evaluated by processing unit 115 and/or processing unit 125 for determining whether a sufficient credit line and/or cash is available.

In an exemplary embodiment, in order to determine whether at least one other payment method is available, processing unit 115 and/or processing unit 125 determines the difference between the balance of reward account 310, 410 and the converted purchase amount (referred to hereinafter as the "difference amount"). After determining the difference amount, processing unit 115 and/or processing unit 125 determines whether financial account 305 has an open credit line and/or cash that is greater than or equal to the difference amount, for example, upon retrieving data stored in memory unit 120. If financial account 305 has a sufficient open credit line and/or balance, then processing unit 115 transmits data indicating transaction authorization to the respective one of the plurality of merchants 140a...140n, in 555. Processing unit 115 and/or processing unit 125 then adjusts the balance of reward account 310 to reflect the purchase amount, in 560. For example, the balance of reward account 310, 410 is decreased to zero or negative reward units predetermined by one or more business rules. The difference amount is credited or debited from financial account 305 depending on whether a credit line or cash, respectively, was used to fund part or all of the purchase amount, in 570. If financial account 305 has both a credit line and cash, then both can be used if need be in order to fund the purchase amount.

If financial account 305 does not have a sufficient open credit line and/or cash, processing unit 115 searches for other accounts associated with cardholder 145 and if one or more such accounts are located, data regarding the account(s) is retrieved from memory unit 120 for locating another potential source for funding the difference amount. If no such account is located by processing unit 115 or if one or more accounts are located but do not have a sufficient credit line or cash, alone or in combination, processing unit 115 transmits data indicating that the transaction has been denied to the respective one of the plurality of merchants 140a...140n, in 550.

On the other hand, if one or more other accounts are located by processing unit 115, processing unit 115 transmits data to the respective one of the plurality of merchants 140a...140n indicating approval of the transaction, in 555. Depending on the purchase amount, the balance of the reward account balance is decreased, for example, to zero or negative reward units, in 560. Further, the credit line and/or cash of the one or more other accounts, for instance, financial account 305, is increased and/or decreased, respectively, to fund the difference amount, 570.

The respective one of the plurality of merchants 140a...140n receives transaction authorization data or transaction denial data from processing unit 115 via credit/debit network 135 and consummates or does not consummate, respectively, the transaction with cardholder 145. As will be appreciated by a person having ordinary skill in the art, regardless whether conventional magnetic stripe 215 or reward magnetic stripe 220 is read at the respective merchant 140a...140n, the merchant's experience is the same and hence the use of reward magnetic stripe 220 by cardholder 145 to make a purchase and the subsequent processing is transparent to the respective merchant.

Alternatively, rewards account 310, 410 can have a balance equal to an amount of money earned from a rewards and cash back program. For example, for every predetermined amount that cardholder 145 spends using financial account 305 or for predetermined transactions whether using conventional magnetic stripe 215 or otherwise, a predetermined percentage of the amount of the purchase is deposited into rewards account 310, 410. Accounts other than account 305 can also be linked thereto so that cardholder 145 earns additional reward units or cash back. The accumulated cash in rewards account 310, 410 can be redeemed by cardholder 145 and the transaction can be processed in the same manner as described herein for redeeming points.

The present application is not limited to rewards account 310, 410 being associated with accumulated reward units and cash back. Rather, other rewards, incentives or the like can be accumulated and redeemed by using reward magnetic stripe 220 such as credits, savings, certificates, changing membership status, for example, gold membership status to platinum membership status in a tiered product and special servicing, for example, a cardholder always gets a live telephone associate or the use of a specialized rewards planner.

In an alternative embodiment of the present application, as opposed to data indicating account number(s) being stored on conventional magnetic stripe 215 and reward magnetic stripe 220, the magnetic stripes are encoded with data used by processing unit 115 to determine the respective account number, for instance, by utilizing a look-up table or the like stored in memory unit 120 and/or memory unit 130. In a further alternative embodiment of the present application, data indicating the same account number is encoded on conventional magnetic stripe 215 and reward magnetic stripe 220. However, at least one of the plurality of data fields associated with each of the magnetic stripes is encoded with data used by processing unit 115 to determine whether to access financial account 305 or rewards account 310, 410, for instance, by utilizing a look-up table or the like stored in memory unit 120 and/or memory unit 130.

The embodiments described above are illustrative examples of the present application and it should not be construed that the present application is limited to these particular embodiments. Various changes and modifications may be effected by one skilled in the art without departing from the spirit or scope of the invention as defined in the appended claims.

What is claimed is:

1. A transaction card, comprising:
   a substrate having a first face and a second face;
   a first magnetic stripe for storing data associated with a credit account, the first magnetic stripe being located along an edge of the second face;
   a second magnetic stripe for storing data associated with a rewards account, the second magnetic stripe being located along another edge of the second face and operable for redeeming at least one reward unit; and
   account information located on the first face, the account information being associated with the credit account and the rewards account.

2. The transaction card as set forth in claim 1, wherein the second magnetic stripe includes a plurality of data fields, data stored in at least one of the plurality of data fields identifying the second magnetic stripe as being associated with the rewards account.

3. The transaction card as set forth in claim 1, wherein the second magnetic stripe includes a plurality of data fields, no data stored in at least one of the plurality of data fields identifying the second magnetic stripe as being associated with the rewards account.

4. The transaction card as set forth in claim 1, wherein the rewards account is operable as a debit account.

5. The transaction card as set forth in claim 4, wherein the rewards account has a balance equal to a number of accumulated reward units, the at least one reward unit operable as currency.

6. The transaction card as set forth in claim 5, wherein the at least one reward unit is one of a plurality of points or a plurality of miles.

7. The transaction card as set forth in claim 5, wherein the balance of the rewards account is increased one reward unit per dollar spent using the credit account.

8. The transaction card as set forth in claim 5, wherein the balance of the rewards account is increased a portion of a reward unit per dollar spent using the credit account.

9. The transaction card as set forth in claim 5, wherein the balance of the rewards account is increased one reward unit for a plurality of dollars spent using the credit account.

10. The transaction card as set forth in claim 5, wherein the balance of the rewards account is increased one reward unit per dollar spent using another account.

11. The transaction card as set forth in claim 5, wherein the balance of the rewards account is increased a portion of a reward unit per dollar spent using another account.

12. The transaction card as set forth in claim 1, wherein the reward account is operable as a cash back account, a balance of the rewards account increasing by an amount equal to a predetermined percentage of an amount of a purchase using the credit account.

13. The transaction card as set forth in claim 1, wherein the reward account is operable as a cash back account, a balance of the rewards account increasing by an amount equal to a predetermined percentage of an amount of a purchase using the another account.

14. The transaction card as set forth in claim 1, wherein the at least one reward unit is a credit, a saving or a certificate, and
the rewards account includes data indicating a value the credit, the saving or the certificate, the value being redeemable with at least one of plurality of merchants using the second magnetic stripe.

15. The transaction card as set forth in claim 1, wherein the substrate is constructed of at least one transparent material.

16. The transaction card as set forth in claim 1, wherein the substrate is constructed of at least one translucent material.

17. A transaction card, comprising:
a substrate having a first face and a second face;
a first magnetic stripe for storing data associated with a credit account, the first magnetic stripe being located along an edge of the second face; and
a second magnetic stripe for storing data associated with a rewards account, the second magnetic stripe being located along another edge of the face and operable for redeeming at least one reward unit, the second magnetic stripe including a plurality of data fields, data stored or no data being stored in at least one of the plurality of data fields identifying the second magnetic stripe as being associated with the rewards account, wherein
account information is located on the first face, the account information being associated with the credit account and the rewards account, and
the rewards account has a balance equal to a number of accumulated reward units, the reward units operable as currency with at least one of a plurality of merchants using the second magnetic stripe.

18. A transaction card, comprising:
a substrate having a first face and a second face;
a first magnetic stripe for storing data associated with a credit account, the first magnetic stripe being located along an edge of the second face;
a second magnetic stripe for storing data associated with a rewards account, the second magnetic stripe being located along another edge of the second face and operable for redeeming at least one reward unit;
first account information located on the first face, the first account information being associated with the credit account; and
second account information located on the first face, the second account information being associated with the rewards account.

19. A method for processing a transaction initiated with a merchant using a transaction card having at least two magnetic stripes, the method comprising:
receiving data associated with the transaction, the data including a purchase amount;
determining according to the received data whether a first magnetic stripe or a second magnetic stripe was read at the merchant, the second magnetic stripe being associated with a rewards account and operable for redeeming at least one reward unit;
converting the purchase amount to an amount of reward units, if it is determined that the second magnetic stripe was read at the merchant; and
determining whether the rewards account has a balance of reward units at least equal to the amount of converted reward units.

20. The method as set forth in claim 19, further comprising:
authorizing the transaction if the balance of the rewards account is at least equal to the amount of converted reward units; and
decreasing the balance of the rewards account by at least the amount of converted reward units.

21. The method as set forth in claim 19, further comprising:
authorizing the transaction if the balance of the rewards account is less than the amount of converted reward units;
determining a difference amount by subtracting the amount of converted reward units from the balance of the rewards account;
decreasing the balance of the rewards account to a zero balance; and
at least one of increasing a credit line of a credit account associated with the rewards account by the difference amount or decreasing a balance of a debit account associated with the rewards account by the difference amount.

22. The method as set forth in claim 19, wherein
determining according to the received data whether the first magnetic stripe or the second magnetic stripe was read at the merchant includes
determining whether at least one predetermined data field includes data, wherein
if the at least one predetermined data field includes data, then the first magnetic stripe was read at the merchant, and if the at least one predetermined data field does not include data, then the second magnetic stripe was read at the merchant.

23. The method as set forth in claim 19, wherein determining according to the received data whether the first magnetic stripe or the second magnetic stripe was read at the merchant includes
determining whether at least one predetermined data field includes data, wherein
if the at least one predetermined data field includes data, then the second magnetic stripe was read at the merchant, and
if the at least one predetermined data field does not include data, then the first magnetic stripe was read at the merchant.

24. The method as set forth in claim 19, wherein determining according to the received data whether the first magnetic stripe or the second magnetic stripe was read at the merchant includes
evaluating data stored in at least one predetermined data field.

25. The method as set forth in claim 19, wherein converting the purchase amount to the amount of reward units includes
identifying the purchase amount,
determining a conversion rate associated with the rewards account, and
multiplying the purchase amount by the conversion rate.

26. The method as set forth in claim 19, wherein determining whether the rewards account has the balance of reward units at least equal to the amount of converted reward units includes
determining the balance of reward units, and
comparing the balance of reward units to the amount of converted reward units.

27. A transaction card, comprising:
a substrate having a first face and a second face;
a first magnetic stripe for storing data associated with an account, the first magnetic stripe being located along an edge of the second face;
a second magnetic stripe for storing data associated with a rewards account, the second magnetic stripe being located along another edge of the second face and operable for redeeming at least one reward unit; and
account information located on the first face, the account information being associated with the account and the rewards account.

28. The transaction card as set forth in claim 27, wherein the account and the rewards account are associated with different entities.

29. The transaction card as set forth in claim 28, wherein the entity associated with the account and the entity associated with the reward account are financial institutions.

30. A transaction card, comprising;
a substrate having a first face and a second face;
a first magnetic stripe for storing data associated with an account, the first magnetic stripe being located along an edge of the second face;
a second magnetic stripe for storing data associated with a rewards account, the second magnetic stripe being located along another edge of the substrate and operable for redeeming at least one reward unit; and
account information located on the substrate, the account information being associated with the account and the rewards account.

31. The transaction card as set forth in claim 30, wherein the account and the rewards account are associated with different entities.

32. The transaction card as set forth in claim 31, wherein the entity associated with the account and the entity associated with the reward account are financial institutions.

33. A transaction card, comprising:
a substrate having a first face and a second face;
a first magnetic stripe for storing data associated with an account, the first magnetic stripe being located along an edge of the second face;
a second magnetic stripe for storing data associated with a rewards account, the second magnetic stripe being located along another edge of the substrate and operable for redeeming at least one reward unit; and
account information located on the substrate, the account information being associated with the account and the rewards account, wherein
the account and the reward account fund a transaction when the data on the second magnetic stripe is read.

34. The transaction card as set forth in claim 33, wherein the account and the rewards account are associated with different entities.

35. The transaction card as set forth in claim 34, wherein the entity associated with the account and the entity associated with the reward account are financial institutions.

36. A transaction card, comprising:
a substrate having a first face and a back face;
a first magnetic stripe for storing data associated with a first account, the first magnetic stripe being located along an edge of the back face;
a second magnetic stripe for storing data associated with a second account, the second account being a reward account, the second magnetic stripe being located along another edge of the substrate and the second magnetic stripe operable for redeeming a reward; and
account information located on the substrate, the account information being associated with the first account and the reward account, wherein
the reward account and a third account fund a transaction when the data on the second magnetic stripe is read.

37. The transaction card as set forth in claim 36, wherein the account and the rewards account are associated with different entities.

38. The transaction card as set forth in claim 36, wherein the reward account and the third account are associated with different entities.

39. The transaction card as set forth in claim 37, wherein the entity associated with the account and the entity associated with the reward account are financial institutions.

40. The method as set forth in claim 19, further comprising:
authorizing the transaction if the balance of the rewards account is less than the amount of converted reward units;
determining a difference amount by subtracting the amount of converted reward units from the balance of the rewards account; and
one of increasing a credit line of the credit account by the difference amount or decreasing a balance of a debit account by the difference amount.

41. The method as set forth in claim 19, further comprising:
    authorizing the transaction if the balance of the rewards account is less than the amount of converted reward units; and
    one of increasing a credit line of the credit account by the amount of the converted reward units or decreasing a balance of a debit account by the amount of converted reward units.

42. The method as set forth in claim 19, further comprising:
    authorizing the transaction if the balance of the rewards account is less than the amount of converted reward units;
    determining a difference amount by subtracting the amount of converted reward units from the balance of the rewards account; and
    one of increasing a credit line of another credit account by the difference amount or decreasing a balance of a debit account by the difference amount.

43. The method as set forth in claim 19, further comprising:
    authorizing the transaction if the balance of the rewards account is less than the amount of converted reward units; and
    one of increasing a credit line of another credit account by the amount of the converted reward units or decreasing a balance of a debit account by the amount of converted reward units.

* * * * *